June 5, 1928. 1,672,163

H. E. KRAMMER

AIRCRAFT

Filed April 24, 1920  15 Sheets-Sheet 1

Inventor
Henry E. Krammer
By his Attorney

June 5, 1928.

H. E. KRAMMER

AIRCRAFT

Filed April 24, 1920 15 Sheets-Sheet 2

1,672,163

Inventor
Henry E. Krammer
his Attorney

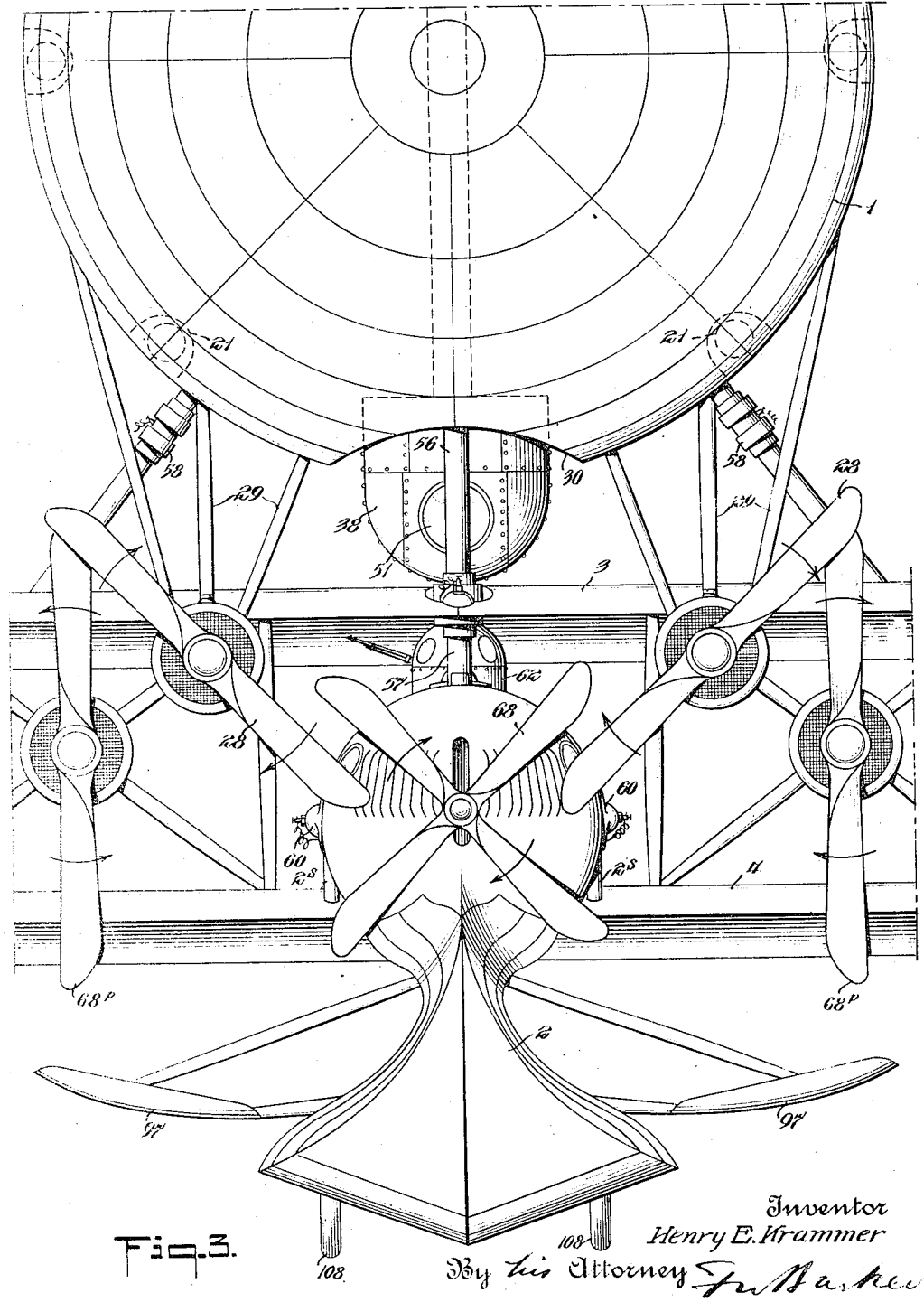

June 5, 1928.  H. E. KRAMMER  1,672,163
AIRCRAFT
Filed April 24, 1920    15 Sheets-Sheet 4
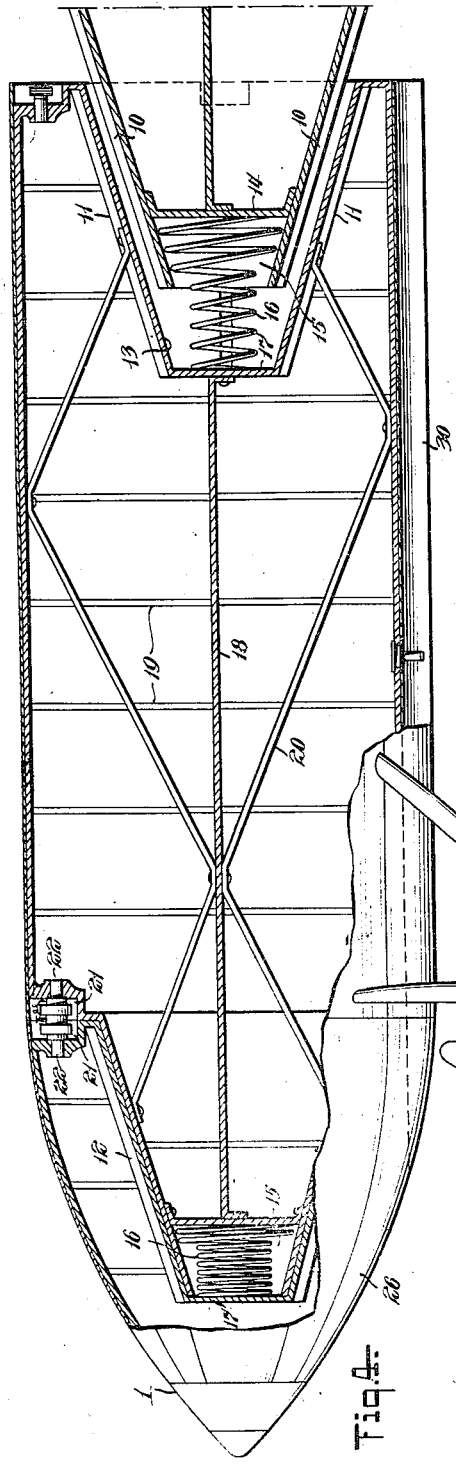
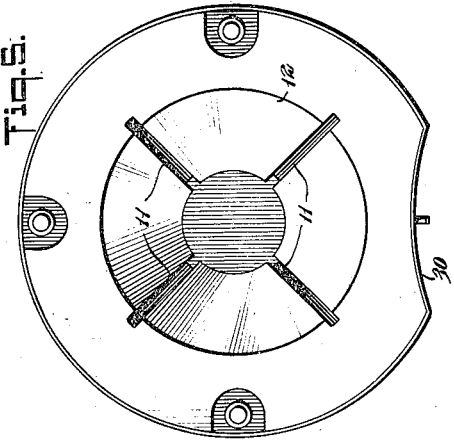
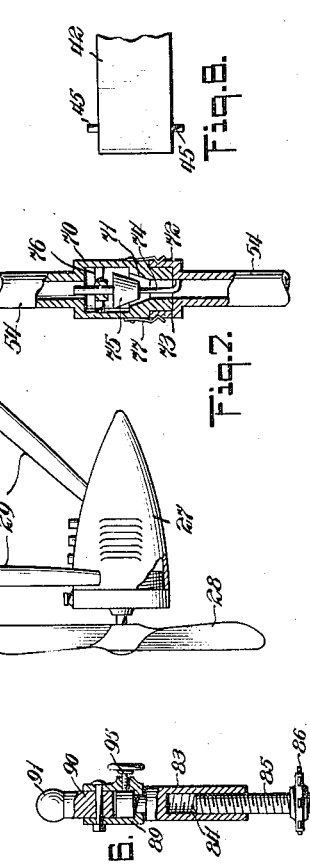
Inventor
Henry E. Krammer
By his Attorney

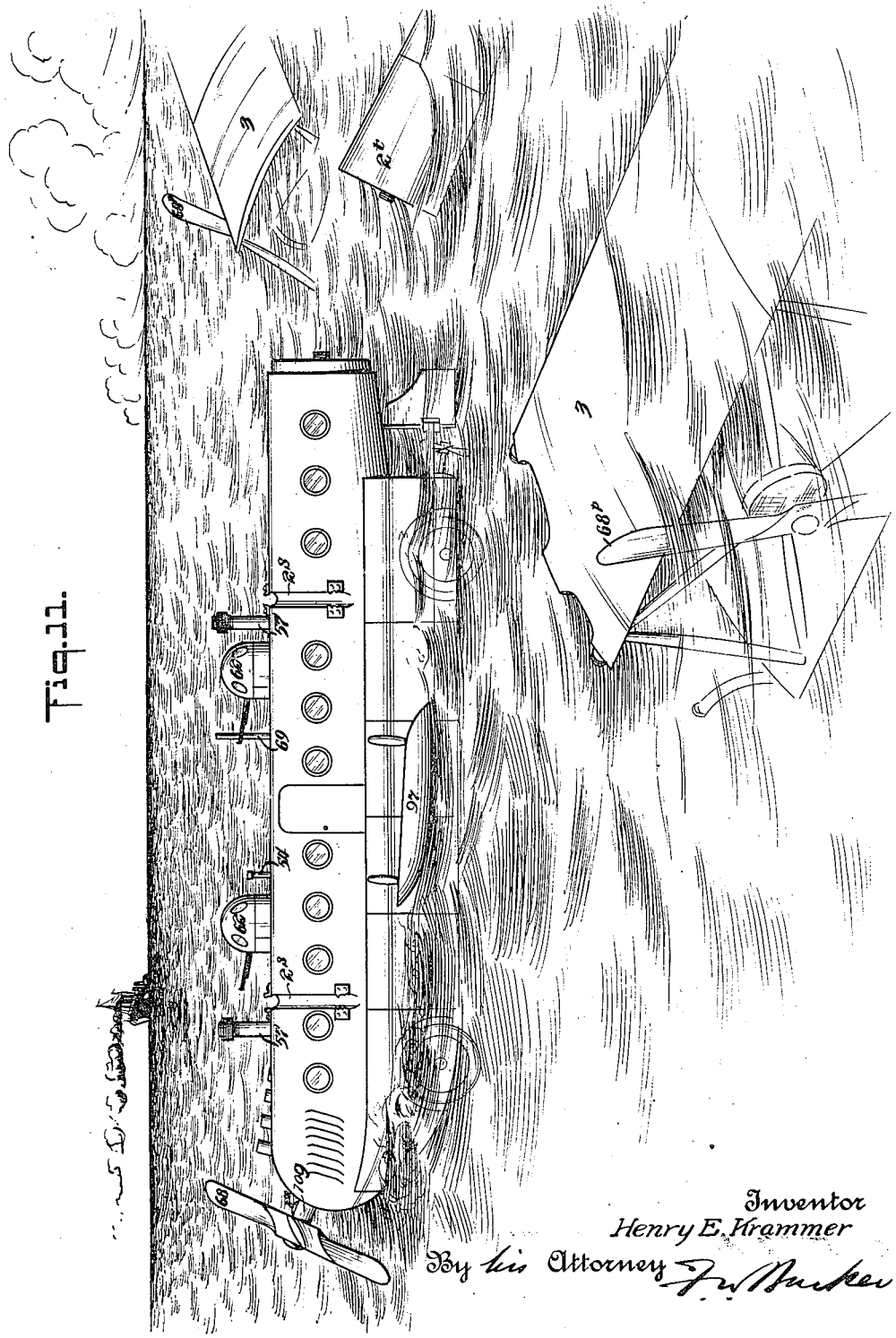

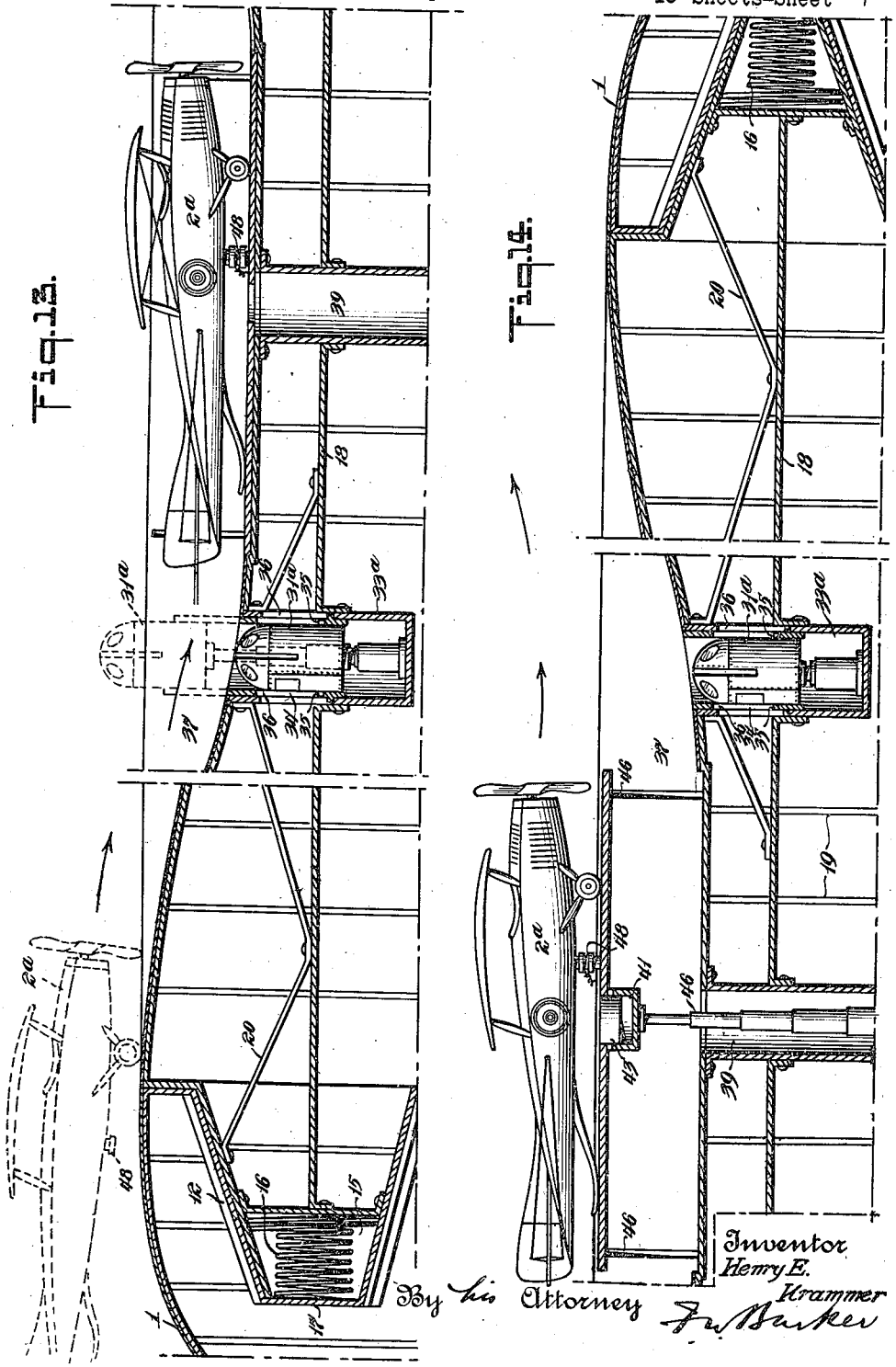

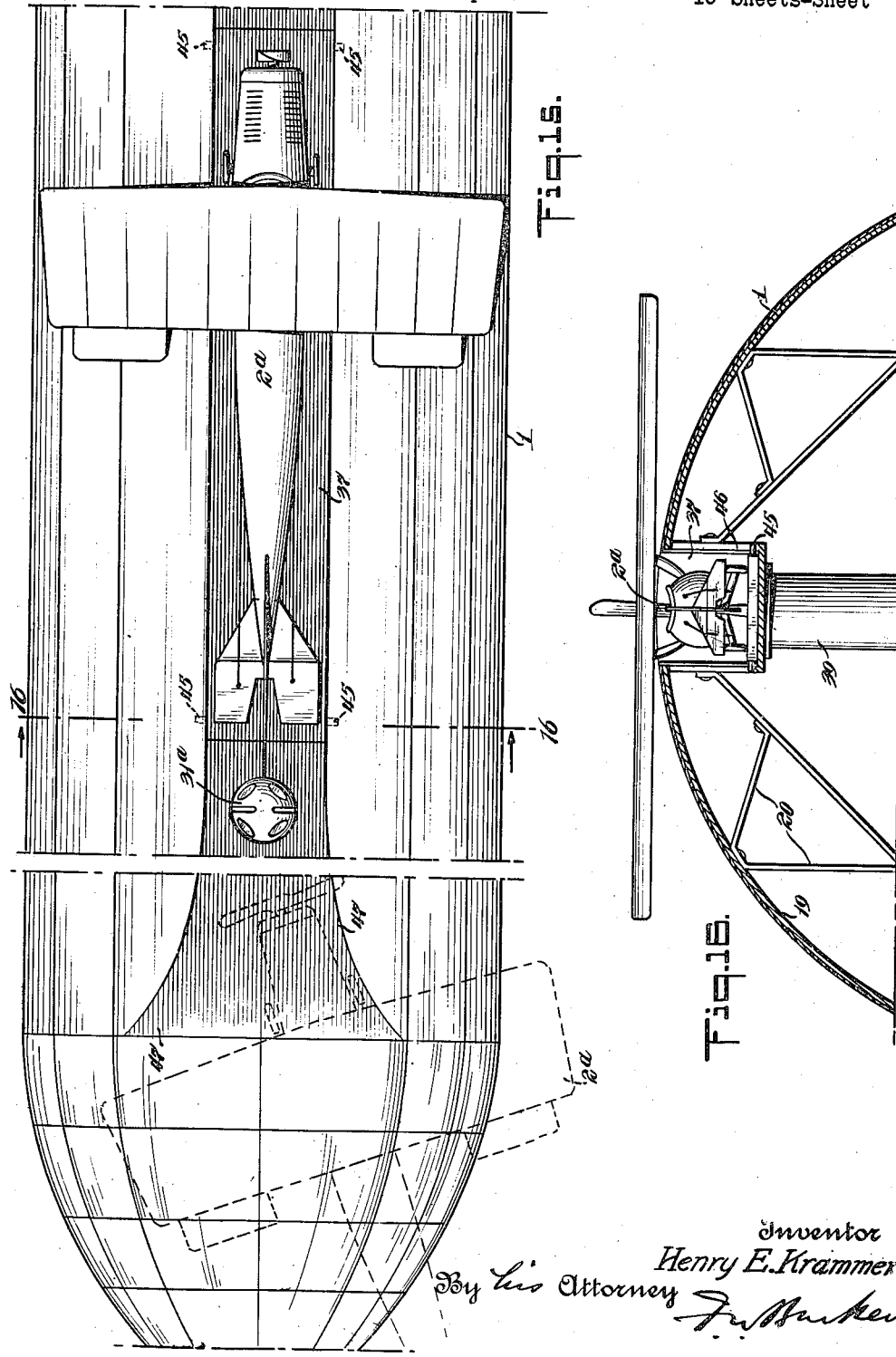

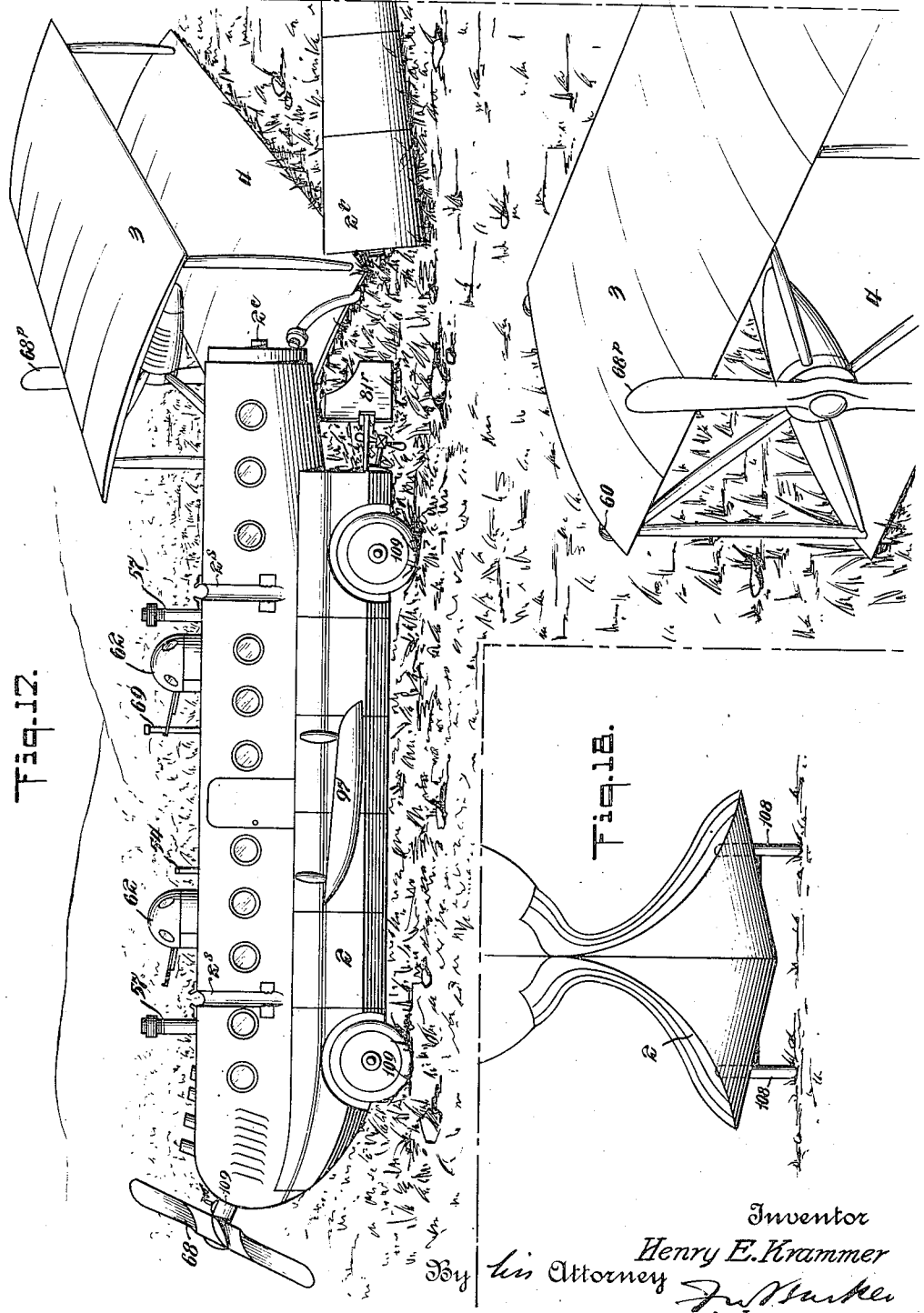

June 5, 1928.

H. E. KRAMMER

AIRCRAFT

Filed April 24, 1920

Inventor
Henry E. Krammer
By his Attorney

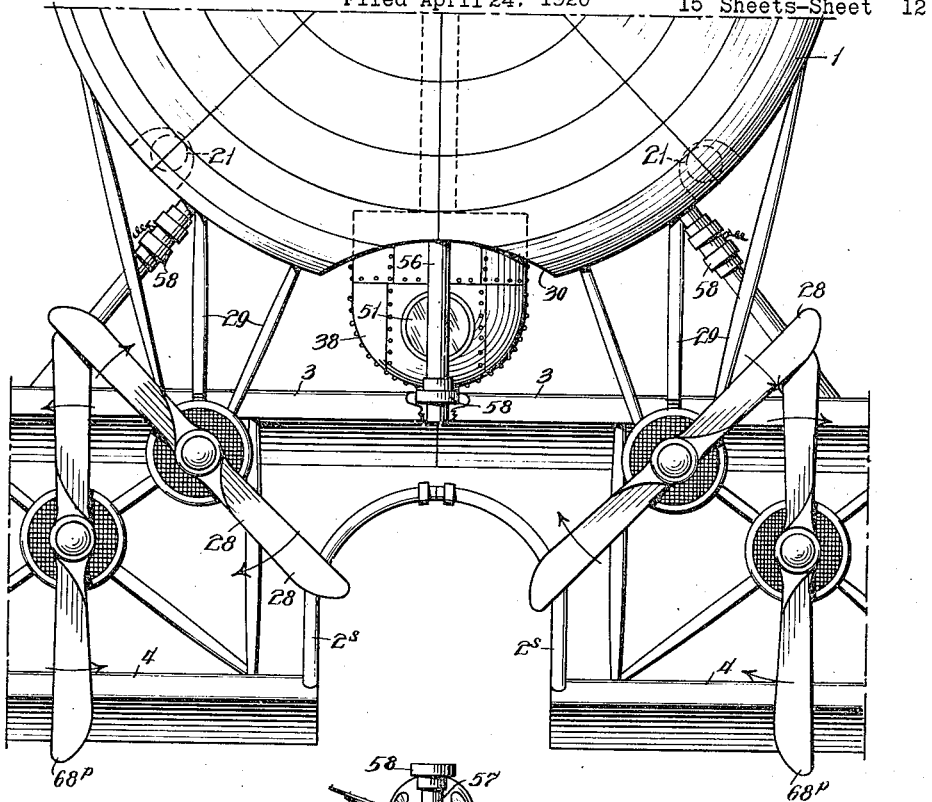
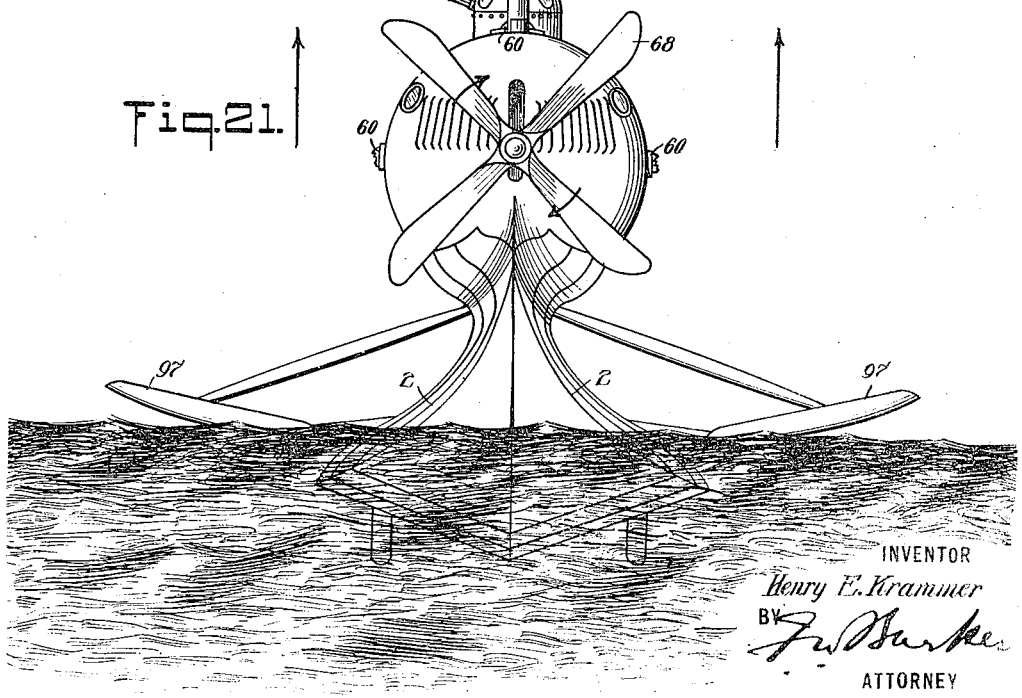
Fig. 21.

June 5, 1928.  H. E. KRAMMER  1,672,163
AIRCRAFT
Filed April 24, 1920   15 Sheets-Sheet 13
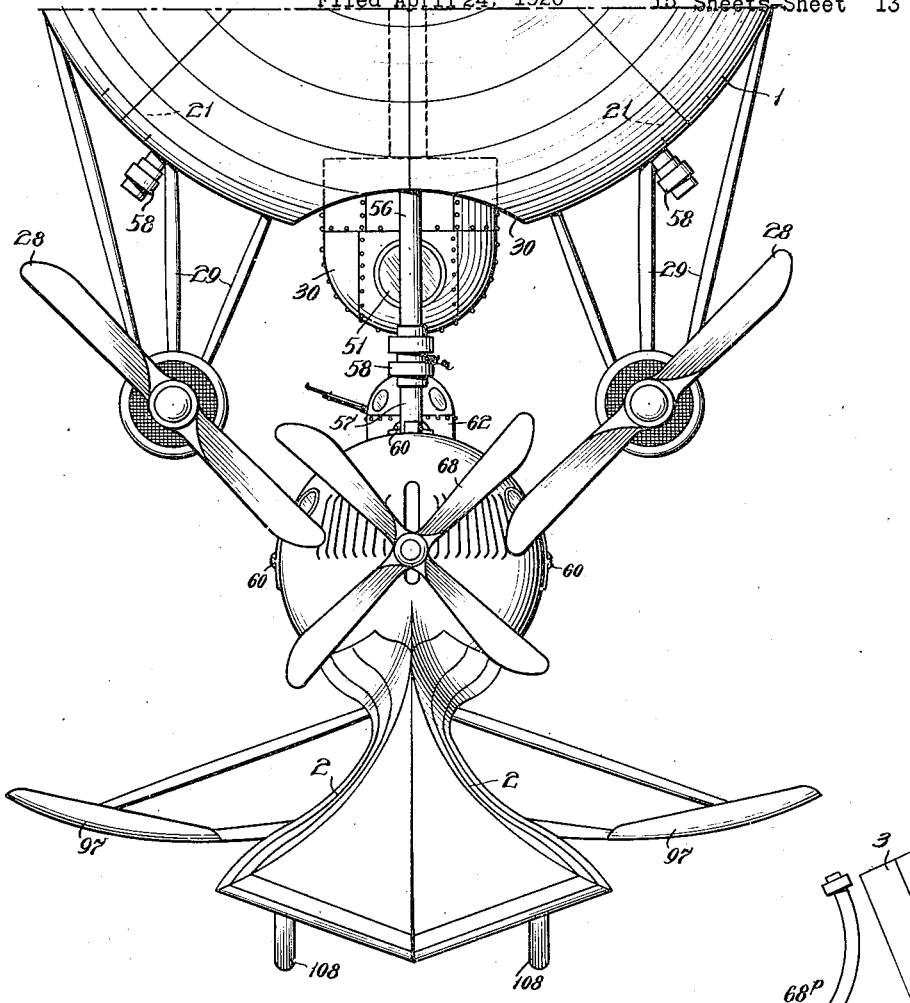
Fig.22.
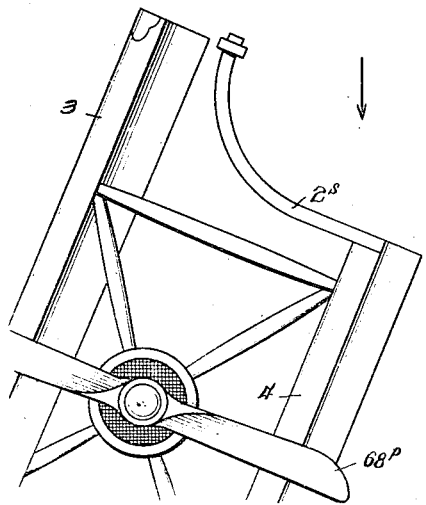
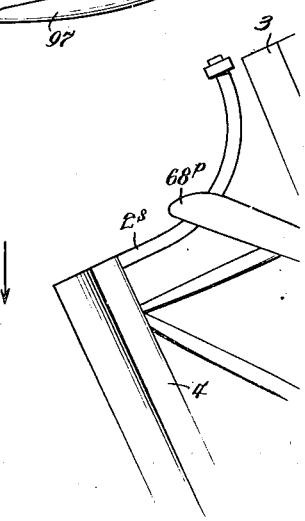
INVENTOR
Henry E. Krammer
BY
ATTORNEYS

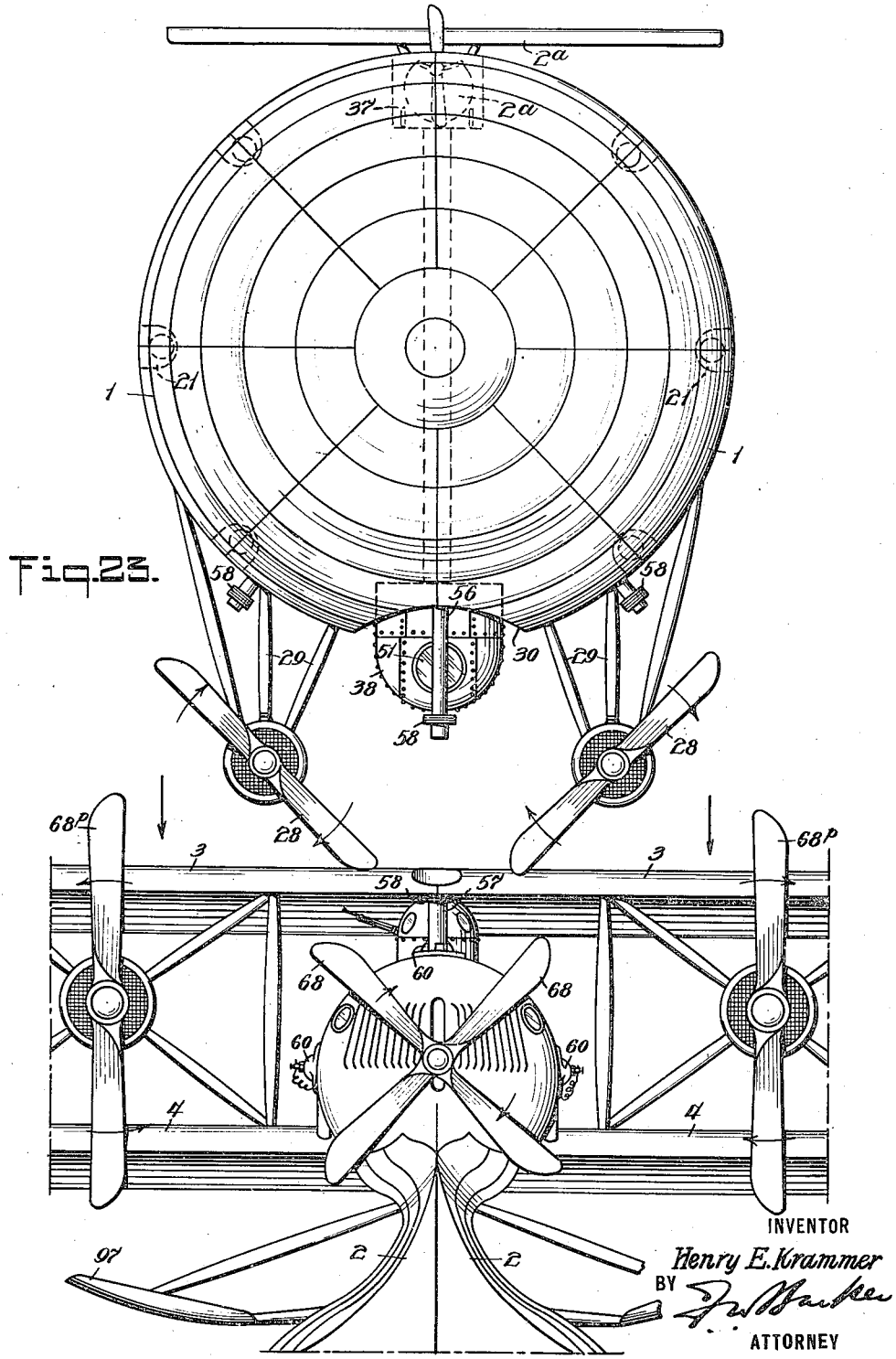

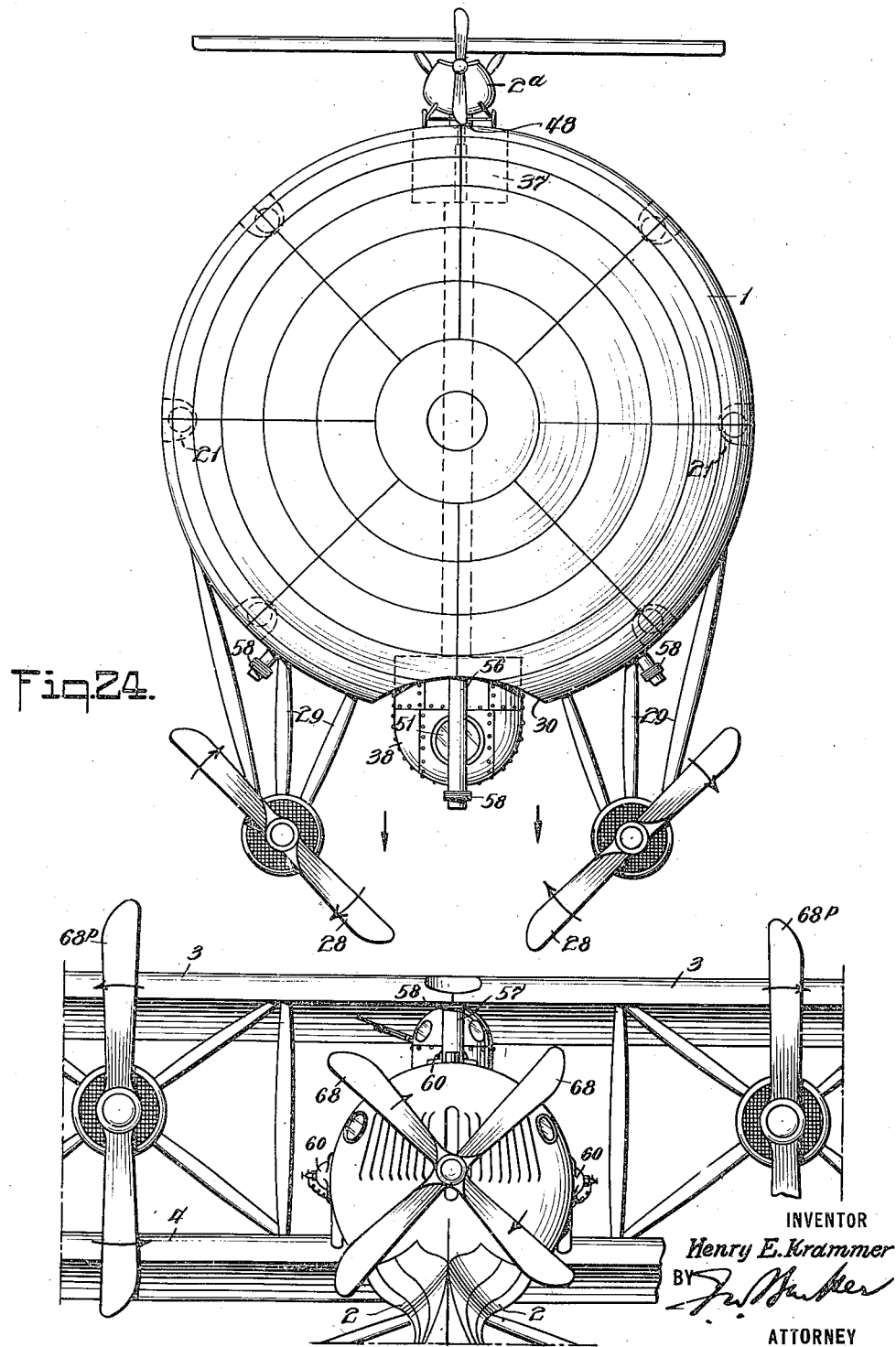

Patented June 5, 1928.

1,672,163

UNITED STATES PATENT OFFICE.

HENRY E. KRAMMER, OF NEW YORK, N. Y.

AIRCRAFT.

Application filed April 24, 1920. Serial No. 376,325.

This invention relates to aircraft, and my improvements are directed particularly to the production of an integral structure embodying provisions for both buoyant and dynamic lift and sustentation in air, said structure also including means for the separation of the buoyant and dynamic lift units; and, still further, said dynamic lift unit including separable flotation means for use on water, wherein said flotation means itself may constitute a distinct unit for service alone or in conjunction with the dynamic lift unit.

Thus my invention may be said to comprise a composite craft wherein, (1) the buoyant support of a dirigible is augmented by the dynamic lift of an airplane; (2) wherein the dirigible is dis-engagable from the airplane and operable solely as a lighter-than-air craft; (3) wherein the airplane is disengageable from the dirigible and is operable solely as a heavier-than-air craft; (4) wherein the airplane, in conjunction with the flotation element, is operable as a flying boat; (5) wherein the flotation element, upon disassociation from the airplane, is operable as a speed boat or land vehicle either for military or other purposes; and (6) wherein means of intercommunication are provided between the cabin of the dirigible and the fuselage of the heavier-than-air machine to permit the pilot or other persons carried by said cabin and fuselage to pass with safety from one craft to the other, while in engaged relation, so that in the event one of said crafts becomes disabled the occupants thereof may find security in the other craft before the disabled craft is separated therefrom.

In the practical embodiment of these inventive features, wherein the dirigible, airplane, and boat are all united in integral formation for inter-related effect, the framework of the composite structure supports integrally the gas bag unit with its component elements, and the boat unit with its component elements. Those parts of the framework however which connect the dirigible with the airplane are rupturable as by the means described in my co-pending application Serial No. 243,564 so that these two units may be separated one from the other in case one is destroyed and it is desirable to relieve the other from association therewith; or provided the occasion arises for the independent use of either or both of said units.

Also, similar means for rupturing the connections between the airplane and its boat are provided so that if in the operation of these units as a seaplane the airplane should be destroyed or damaged it may be separated from the boat, which latter having the power plant and steering means, and being provided with offensive and defensive means, may then be operated exclusively as a boat, without incumbrance of any kind.

Auxiliary features of my invention include:

1. Means upon the surface of the dirigible for the alighting thereon and taking off therefrom of a scout airplane.

2. The construction of a dirigible in longitudinal sections having rupturable connections, a section thereof, when disassociated, itself presenting suitable bow and stearn contours for dirigible navigation.

3. The provisions of an inset car in the dirigible bottom to carry fuel, freight, the pilot, etc; also a vertical passage through the body of the gas bag to afford communicating means from the car to a recessed observation space in the upper portion of the dirigible, with a telescoping hoist for conveyance from the car to the top of the dirigible.

4. The dirigible provided with gun turrets which normally are concealed within vertical passages in the body of the gas bag, but having telescopic means of elevation, operable by compressed air for service.

5. Power plants for the dirigible carried by hangers depending from the bottom of the dirigible, and divided fuel compartments located in the dirigible bottom with pipe lines leading therefrom to said power plants.

6. Stout vertical posts secured to the dirigible bottom and depending therefrom to securely engage the boat in the composite arrangement, said posts having rupturable connections, as premised.

7. Aerofoils mounted upon the boat by rupturable connections.

8. A pipe extending from the fuel supply in the dirigible car and extended through an intervening aerofoil to the boat, for the gravity supply of fuel to the power plant thereof, said pipe having means for automatic closure when the dirigible and the boat are separated, to conserve the fuel.

9. Forward and stern power plants in the boat, wherein the forward power plant is movably mounted for the variation of its shaft, and hence the axis of its propeller, between a horizontal plane and a forwardly upward angle, for lift purposes, the forward propeller being of the airscrew type; whereas the stern power plant has a propeller of the water screw type, and is also movably mounted so that the power shaft may be varied between a horizontal plane and a rearwardly downward plane.

10. Control means for the forward and stern power plants whereby they are rendered adjustable either together or separately.

11. Gun turrets for the boat normally concealed therein, but capable of being elevated by compressed air operating a telescopic mount for service.

12. Means of communication between the cabin of the boat and the car of the dirigible.

13. The provision of steadying pontoons carried by and extending from the sides of the boat.

In the practice of my said invention for war purposes it will be found of inestimable value because by its means different aircrafts, whether of the same general character, or of different characters and types, being associated, may operate together, thereby rendering what I call the composite aircraft capable of utilizing, unitedly, the characteristic qualifications of each unit. But if in battle action one unit of those in the assembled structure, or any element of such unit, should be destroyed, then that unit, or element thereof, by the means comprised herein, can be separated from the whole structure. Furthermore the gunners or other persons on a disabled unit are by my invention enabled to seek safety in passing from said disabled unit to a whole unit, before separation of the units.

In the drawings:—

Fig. 3 is a front partial end view of the same structure, on a still larger scale.

Fig. 4, is a side elevation, partly in vertical section, of a dirigible section.

Fig. 5, is an end view looking into the conoidal recess in a dirigible section.

Fig. 6, is a sectional elevation of an adjustment post for the air screw power plant.

Fig. 7, is an elevation partly in vertical section of a fuel pipe line with automatic valve closure means.

Fig. 8, is a partial plan view of a cover member for the dirigible runway or recess.

Fig. 9, is a detail of the sprocket and chain operating means for adjusting the positions of the power plants.

Fig. 11, is a graphic view of the boat from which the airplane elements have been disconnected.

Fig. 12, is a detail, partly in section, of two members united by rupturable connection means.

Fig. 13, is a partial sectional side elevation, broken away, of a dirigible having a landing and starting runway for a scout airplane.

Fig. 14, is a similar view, showing the recess cover, bearing the scout airplane, elevated for taking off purposes.

Fig. 15, is a top plan view of the dirigible, showing the runway and enlarged entrance thereto.

Fig. 16, is a section on the line 16—16 of Fig. 15.

Fig. 17, is a side elevation of a combine flotation and land craft.

Fig. 18, is a front elevation thereof.

Fig. 21 is a front elevation of the same craft, disintegrated to the extent that the flotation unit has been separated from the other units.

Figure 1:
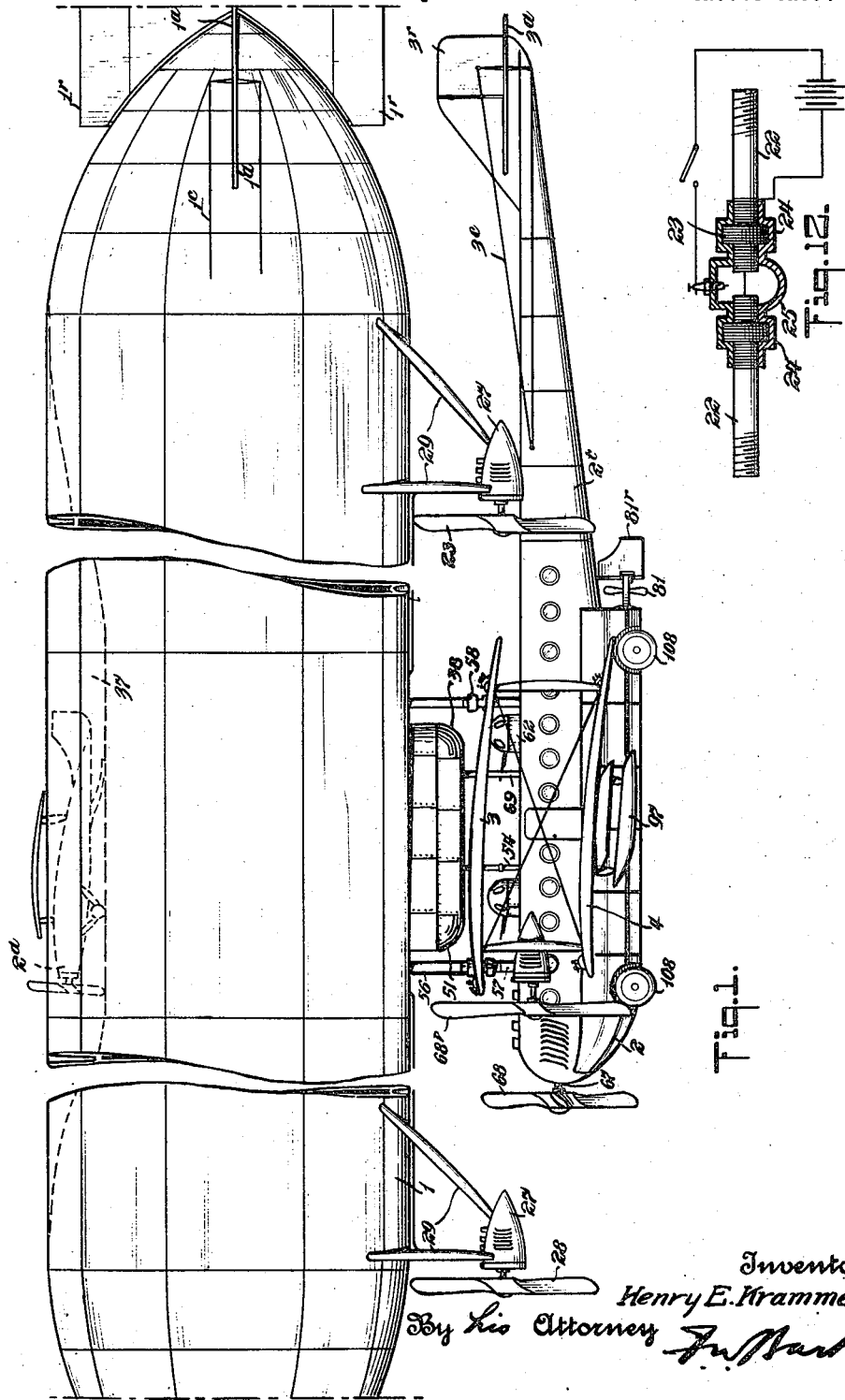
Figure 1 is a side elevation of the composite structure comprising my invention, the dirigible unit thereof being broken away because its full length could not be represented in the available space.

Fig. 22 also shows the same craft, but disintegrated to the extent that a heavier-than-air unit has been separated from the other units.

Fig. 23 likewise shows the same craft, but disintegrated to the extent that a heavier-than-air unit, with flotation unit, have been separated together from the lighter-than-air unit, and Fig. 24 is a similar view to Fig. 23, excepting that here a heavier-than-air unit has been extended above the top of the lighter-than-air unit in order to bring into operation the power plant of said heavier-than-air unit.

For general description purposes, let 1 indicate a dirigible, the numeral being applied to the usual outer envelope; while 2 indicates a boat or flotation element, and 3, 4, respectively the upper and lower aerofoils of a biplane unit, representing an airplane, which is connected with the fuselage as by saddle 2ˢ. The dirigible structure, interiorly of its envelope, is composed of sections which fit together longitudinally, the present drawings illustrating three of said sections, 5, 6, and 7, although obviously the number of sections may be varied. As here shown, however, there is a bow section (5), central section (6) and stern section (7). The central section 6 has oppositely projecting conoidal ends, 8, 9, each having external lengthwise ribs or flanges 10 adapted to engage lengthwise grooves or guide ways 11 which are formed in the outer surfaces of conoidal recesses 12, 13, provided in the respectively adjacent ends of the sections 5 and 7, to thereby secure said sections in their assembled position, against relative rotation.

The central section 6 has at each end a closure wall that is inset from the extreme end of a conoidal formation thereof, leaving an outer end recess 15 in which may be lodged a powerful helical spring 16, which, in the assembled position of the sections, bears oppositely against an end closure wall 17 in either of the recesses 12 or 13, the purpose of said springs being to forceably separate adjacent dirigible sections when released.

The sections 5, 6 and 7, which are constructed of some light and stiff material, such as aluminum or an aluminum alloy, reinforced as by longitudinal brace 18, ribs 19, and tension members 20, have means of rupturable engagement whereby in service they are united in an homogeneous integral structure. For this purpose an annular recess 21 is formed at each opposed end of adjacent sections, and a pair of bolts or screws 22 (see Fig. 12) which are in axially aligned relation, are respectively screwed into or otherwise securely engaged with the opposed end poritions of the adjacent sections. Said bolts or screws each have thereon a shoulder 23, which may be in the form of a nut that is threaded thereon, and said shoulders are each engaged by a housing 24, which housings comprise integral extensions at opposite sides of a chamber 25, that contain fulminate or some explosive that is sufficiently powerful in its explosive effect to rupture its chamber 25, to thereby sunder the bolts 22 and thus to completely release the sections of the dirigible one from another.

The explosive may be discharged by electrical means as more fully described in my co-pending application Serial No. 243,564.

In Fig. 4 I have shown a contour forming bow section 26 to enclose the conoidal portion of the forward section and to accord to the dirigible bow the appropriate shape wherewith it can best oppose the pressures met in speed travel. Obviously, though not shown, a corresponding covering, with appropriate stream-lined contour, may be applied to the rear section of the dirigible.

As means for driving the dirigible, either alone or in conjunction with the other elements of the composite structure, I provide power plants contained in stream-lined housings 27, with propellers 28, and carried by hangers 29 which depend from the dirigible.

Also, to supplement the buoyant lift of the dirigible, I provide its under surface with a lengthwise recess 30, concave in cross-section, to entrap air in forwardly upward flight and thus enhance the climbing ability of the craft under propulsion.

Figure 2:
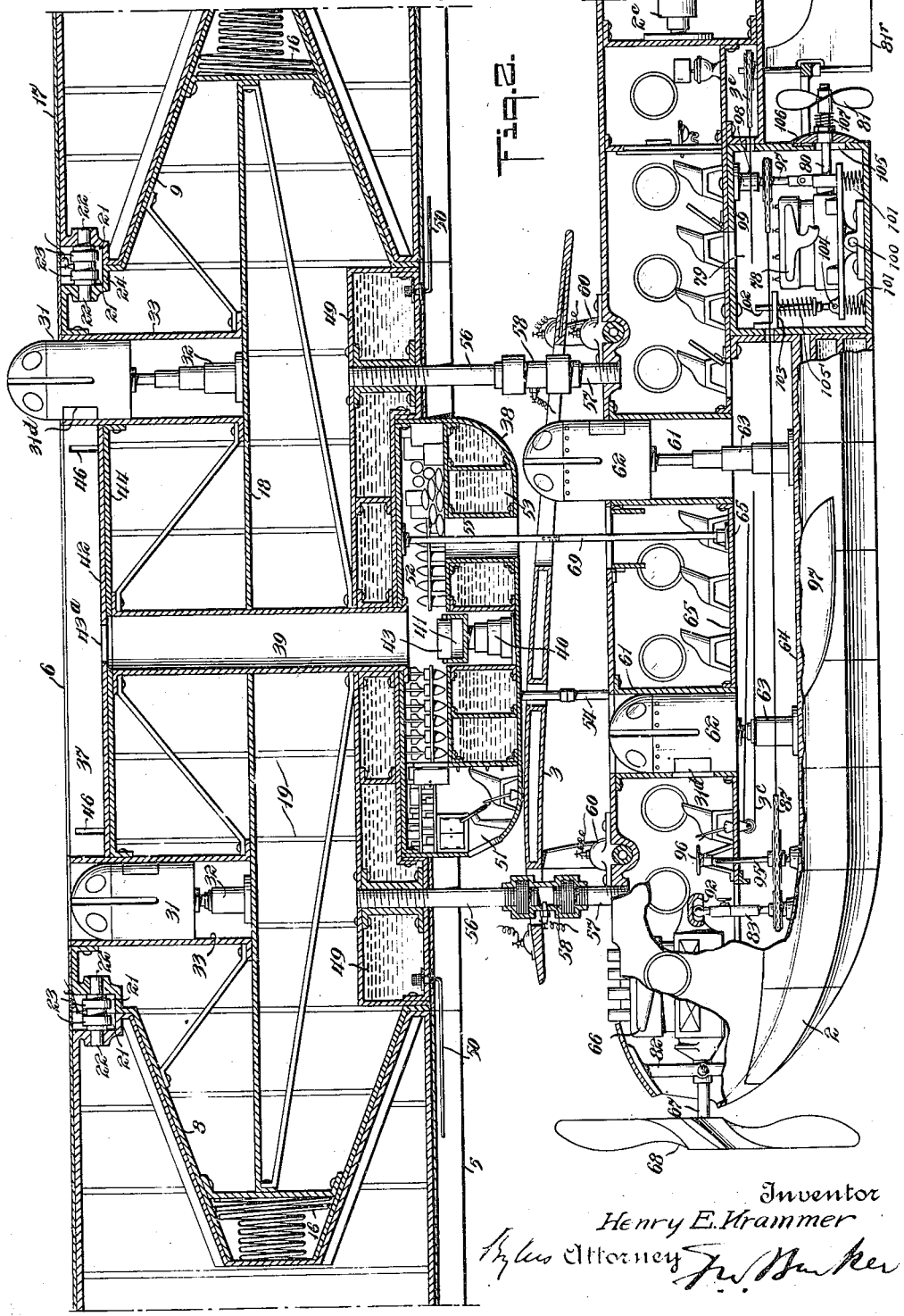
Fig. 2 is a vertical side sectional partial view, enlarged, thereof.
Figure 10:
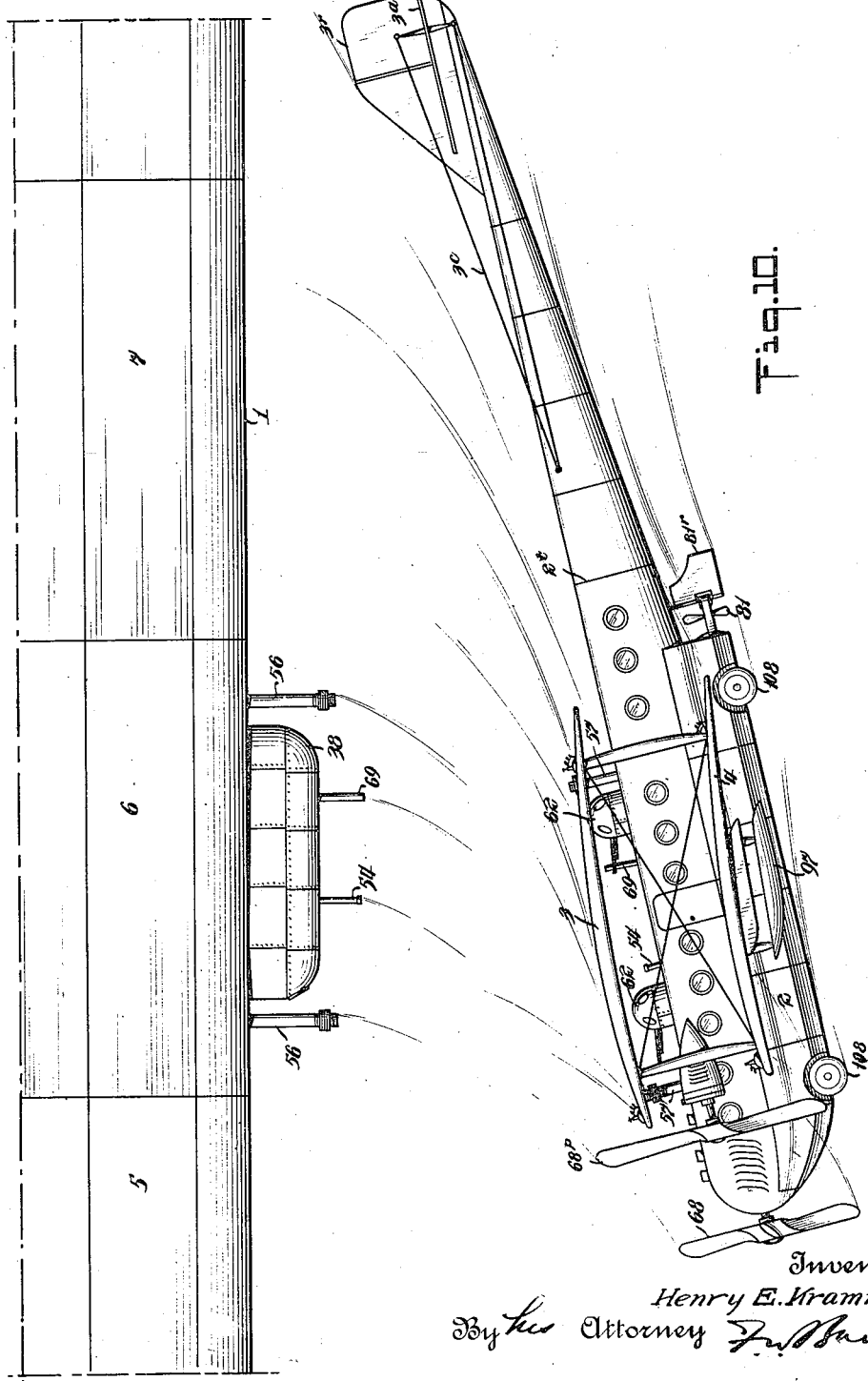
Fig. 10, is a graphic view showing the dirigible and seaplane after disconnection.
Figure 19:
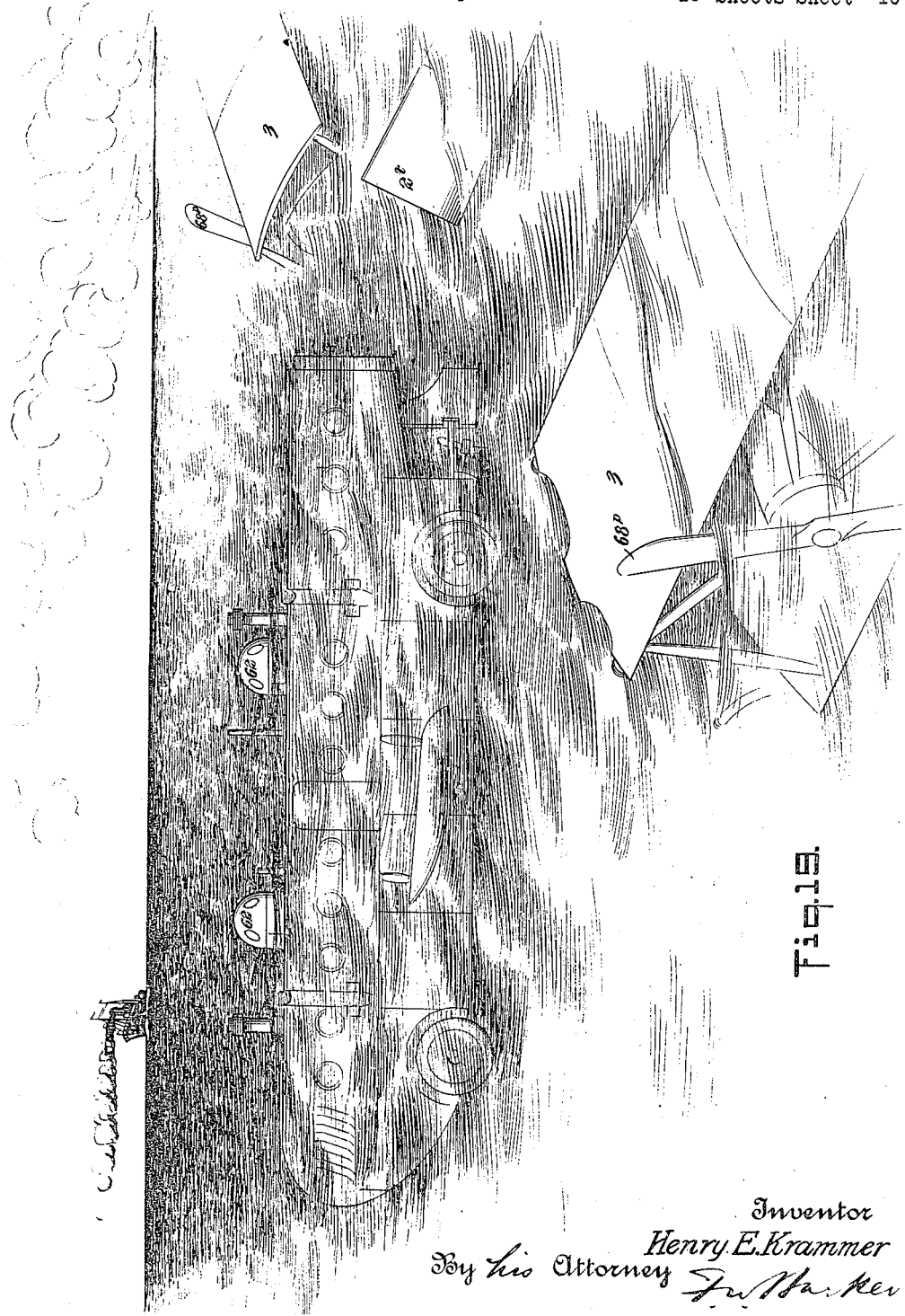
Fig. 19, is a side view of a submersible craft.
Figure 20:
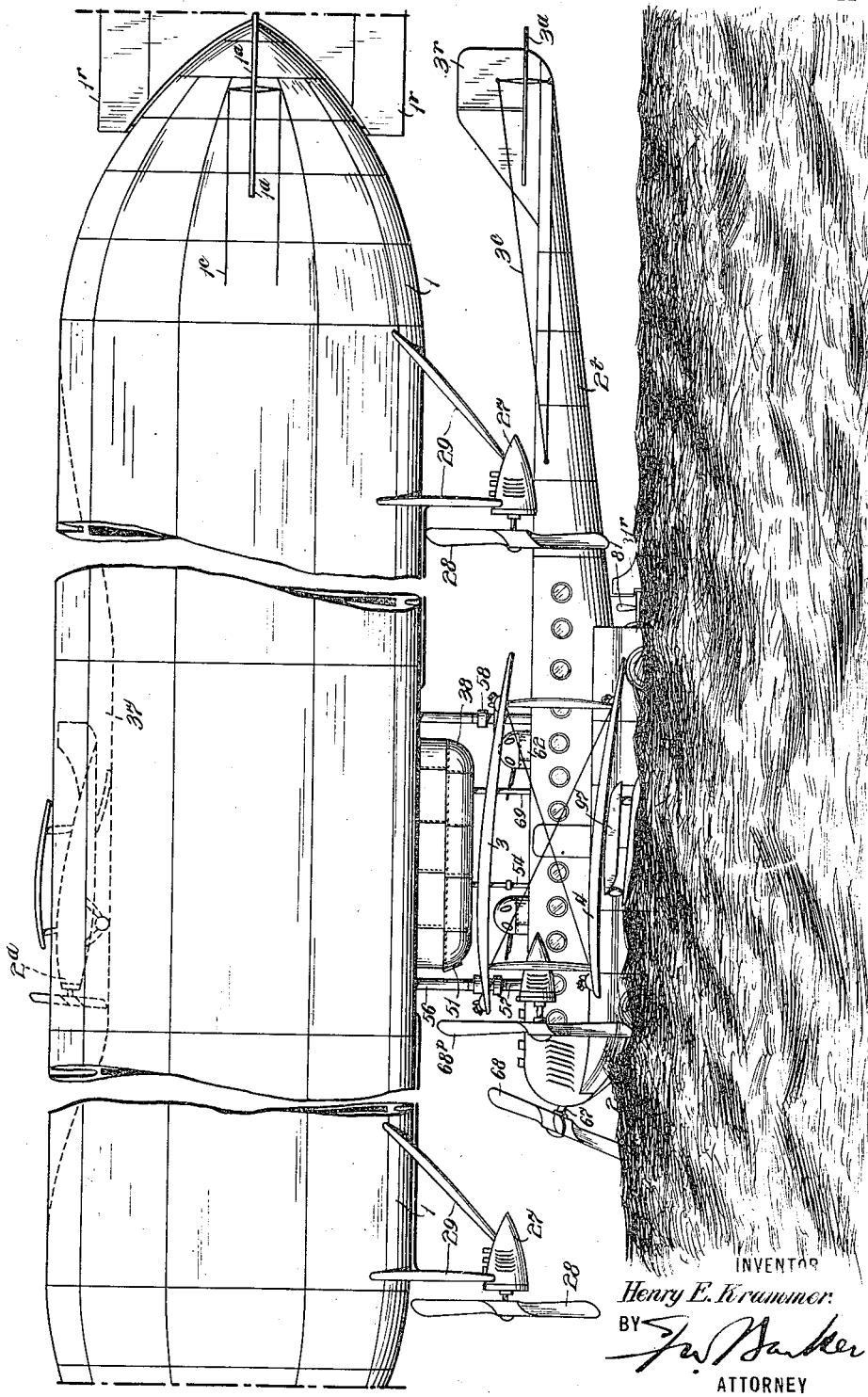
Fig. 20 is a side elevation of a composite craft, comprising in integrated form, a lighter-than-air unit, a plurality of heavier-than-air units, and a flotation unit.

As armament for the craft I provide disappearing gun turrets which normally are concealed entirely within the structure of the dirigible, so as to be out of sight and also to present no additional head resistance during flight. In Fig. 2 these turrets are indicated at 31 as mounted upon telescopic supports 32 which themselves are carried by the longitudinal brace member 18, each turret and its mount being contained within a tubular well 33 that extends up to the top surface of the dirigible. At the left in Fig. 2, a turret is shown as contained within its well, with its mount collapsed, and at the right in said figure a turret, having an entrance 31$^d$, is shown as elevated above the top surface of the dirigible, for service, its mount having been extended for that purpose, either by the use of compressed air as the lifting means, as in my copending application Serial No. 243,565 or otherwise.

In Fig. 13, where the well 33$^a$ is shown as depending below brace 18, the turret 31$^a$ there indicated has a concentric sleeve 34 between it and said well, and lugs 35 upon the turret are slidable in vertical slots 36 in said sleeve to the top of said slots, whereafter further upward movement of said turret extends the sleeve, thus imparting telescopic effect to the turret itself and according it a guided rise beyond the upper surface of the dirigible. This form of turret mechanism is especially applicable in the instance of its employment in the form of my invention illustrated in Figs. 13 and 14, where a depressed channel or passage 37 is formed longitudinally in the upper part of the dirigible. Said passage 37 has a variety of uses, one of which is to serve as an observation, walled platform, reached from the car or cabin 38 by means of a vertical conduit 39 that extends right through the body of the dirigible, from bottom to top thereof. An elevator, in the form of a telescopic mount 40, seated in the car 38, and carrying a cage 41, is adapted to be extended up through said conduit into engagement with a movable cover member 42, said cage having a top portion 43 that engages an orifice 43$^a$ in cover 42, thereby lifting said cover away from the rigid floor 44 of passage 34, to thus provide a cover for said passage. Obviously the top portion 43 may be hollow, that occupants of the cage may have observation over the top of the passage way, and also the cage may have means of egress into the passage way. The movable cover 42 is provided with guides 45, working in slots 46 in the sides of the passage way, to facilitate its elevation and descent.

Another function of the passage way 37 is to receive the landing gear and fuselage of a small or scout airplane, as 2ª, alighting on the top of the dirigible, for which purpose the passage way at its ends is expanded, as shown in Fig. 15, into a flared entrance 47, whereby the airplane in landing approximately in the line of said passage way at its flared entrance, will be guided into the channel thereof, the wings only of said airplane being exposed above said passage way. In Fig. 13 the passage way is shown as approached by a gentle declivity; and, in Fig. 14 as having a corresponding exit, wherefrom the airplane may take off. For taking off, the movable cover 42, to which the airplane may have been secured as by a rupturable connection 48, may be elevated, to thus carry the airplane up into a level plane.

It will be appreciated by those versed in the art of aviation that the alighting of an airplane upon a dirigible will be facilitated by approximately synchronizing the speeds of the two crafts while travelling in the same direction at the time of attempting the landing; and that in taking off of the airplane the speed of travel of the dirigible in the intended launching direction, against the wind, will be a material factor for a successful launching.

Fuel for the dirigible engines is shown as contained in a compartmented reservoir 49 that is inset completely within the hull contour of the dirigible at its underside, fuel being conveyed from said reservoir to the power plants as by piping 50.

The car or cabin 38 is also partly inset within the bottom of the dirigible to reduce the head resistance presented thereby, and, as shown in Fig. 2, its insertion is effected in an upwardly recessed portion of the fuel reservoir 49. Said car or cabin, which extends longitudinally of the dirigible, has a forward compartment 51 for the pilot, and rearwardly thereof said car or cabin is divided into upper and lower portions 52 and 53 respectively, the upper portion 52 serving for the storage of merchandise or ammunition or for occupation by passengers, and the lower portion comprising a compartmented fuel reservoir, from which a fuel delivery pipe 54 depends to furnish fuel for the airplane and boat power plants. Also the reservoir 53 is pierced by a well or conduit 55 as means of communication from below with the compartment 52.

The boat 2, which may have the general structural characteristics referred to in my co-pending application Serial No. 243,565 is pendently connected rigidly with the dirigible by means of stout posts each in two parts 56, 57, wherein said parts are in rupturable engagement, by means as at 58, which may correspond with the means shown in Fig. 12, so that by the separation of the post parts 56, 57, the boat and dirigible units may be separated one from the other.

The boat structure is provided with a supporting unit such as the aerofoils 3, 4, which are secured to struts 59, said struts also being provided with rupturable means as at 60, in order that said supporting unit may be disconnected from the boat in case of necessity.

The boat structure has one or more wells 61, to contain gun turrets 62, which latter while normally contained each within its well, can be elevated for service as by a telescopic mount 63 that is carried by a lower deck 64 of the boat. Also, an upper chamber in the boat, having deck 65, is divided into compartments, whereof the forward compartment contains the pilot's seat and controls, together with an aviation motor 66, whose shaft 67 carries the airscrew propeller 68; the intermediate compartment is provided with passenger accommodation, and the rear compartment may serve as a toilet room.

A pole 69, or other means of communication, is provided to extend from the intermediate compartment with the interior of the dirigible car or cabin 38, said pole for that purpose extending through the well or conduit 55 in said car or cabin.

The fuel pipe 54 through which fuel passes by gravity to the boat for use by its engines, is more completely shown in Fig. 7 as formed in two parts, with a coupled enlargement comprising a valve chamber. Thus the upper part of said coupling has the enlargement 70, containing a valve seat 71, and the lower part has a corresponding, opposed enlargement 72 that fits over a reduced portion 73, of enlargement 70, said lower part also engaging a valve stem 74 axially above seat 71, but said stem being with-drawable from said valve, thus permitting the valve to engage its seat by gravity when the lower part of pipe 54 is removed from the upper part thereof, as by disengagement of the boat from the dirigible. A spider 76 in the enlargement 70 serves as a guide for stem 74; and a spring catch 77 normally serves to tensionally engage the enlargements 70, 72, while the boat and dirigible are united.

The function of valve 75 is to automatically close the passage through pipe 54 when the latter is severed.

In addition to the airplane engine 66, I also provide a marine motor for the boat, the same being indicated at 78 as located in a compartment 79 in the stern of the boat, the shaft 80 of this motor having a water screw propeller 81.

Although in flight either of the composite craft entire, or of the dirigible and seaplane units separately, the air screw propellers only are serviceable, I am enabled through certain adjustment means to contribute power service from the marine motor for marine use only, the water screw propeller then adding its power thrust in water to the thrust in air of the air screw propeller for propulsion of the boat only or the seaplane on water.

As will be noted in Fig. 2 the airplane motor 66 is horizontally pivoted to a forward standard 82, to thus have vertical movement about that axis, thereby effecting angular variation in the plane occupied by shaft 67, so that the thrust of propeller 68 may be exerted either horizontally or at a desired angle. For these adjustment purposes the rearward portion of the engine 66 is mounted upon a post 83 that is adjustable in height. This post is shown as supported upon the deck 64, and its detail construction is illustrated in Fig. 6.

Since the function of the post is to expand and contract in height, the reference numeral 83 by which it has been designated is applied in Fig. 6 to its vertically movable portion, which has, at its lower end, an internally threaded socket 84 with which a screw 85 is engaged; said screw having, at its lower end, a sprocket wheel 86 that engages a sprocket chain 87; while a sprocket wheel 88, to be more particularly referred to hereinafter, comprises a complementary chain engaging member located in the stern part of the boat. The member 83 is connected by a sleeve coupling 89 with the shank 90 of a spherical head piece 91 that has ball joint engagement with a recess 92 in the rear portion of engine 66, which it thereby supports, said shank 90 being secured as by cross-pin 92$^a$ with sleeve 89 from relative turning so that sleeve 89 and part 83, being bound together by set screw 93, rotary motion imparted to screw 85 will move part 83 vertically. But upon loosening set screw 93, which is under the control of the pilot, the part 83 will then be freed and will rotate with screw 85 without vertical movement as the sprocket 86 is driven. Motion is imparted to chain 87 by a sprocket wheel 94, that is mounted on a vertical post 95, and is provided with a hand wheel 96 for manipulation by the pilot.

The sprocket wheel 88 is carried by a post 97 that has threaded engagement with a boss 98, that is secured to the top 99 of the marine engine compartment, so that vertical movement is accorded said post when rotated. Post 97 is in pivotal engagement with a rearward part of the marine motor, which latter has its base mounted on a centrally transverse, rock-bearing 100, helical springs 101 forming front and rear supports beneath the engine base. Also a guide rod 102, operating in a guide 103, has pivotal engagement at 104 with the forward end of the engine base, and an intermediate spring 105, to tensionally steady the motor in its adjusted position. The stern of the boat is provided with a vertical slot 105 for the shaft 80, to permit vertical adjustment of the latter with the motor adjustment; said slot being closed with an outer cap 106, that is mounted on the shaft and has a stuffing box, a helical spring 107 between the propeller hub and said cap serving to hold the latter against the boat stern in water tight closure of slot 105.

Now it will be apparent from the description of the vertical adjustment means for the airplane engine and the marine engine, that with the set screw 93 tightened, the pilot, by turning hand wheel 96, can either lower or raise the rearward portions of both said motors; while with set screw 93 loosened, the same operation will affect only the marine motor without disturbing the position of adjustment of the airplane engine.

The purposes of these adjustments will be obvious, for with the air-screw propeller tilted so that its axis is inclined forwardly upward, the propeller thrust will tend to elevate the bow of the craft, this being desirable for climbing flight, but also, in the case of a sea-plane or boat travelling on water, aiding the craft to skim the water surface like a hydroplane.

The same effect is aided, and additional driving power in water achieved, by depressing the water propeller 81 deeper into the water, for high speed. Both these objects may be accomplished in the same operation by the pilot rotating hand wheel 96 in the direction necessary to depress both motors from their rear portions.

In my co-pending application Serial No. 243,565 I have described the interfitting sectional construction of the boat keel herein illustrated, but in said co-pending application no water-screw power plant is shown. Since I may employ the boat construction of application Serial No. 243,565 with my present invention I add thereto a rearward section 108 to comprise the housing for the water screw power plant 78 and as including the compartment 79.

The side pontoons or floats 97 extend from opposite sides of the boat hull, to which they are attached, and serve as steadying means to prevent excessive rolling of the boat. When the boat structure is employed for land travel, for which purpose it is provided with the wheels 108$^a$, then the floats 97 serve to steady the craft against too great lateral motion.

In the showing of Fig. 11, the air screw propeller is there represented as applied to a craft that is capable of either surface or under surface operation, which may be the form of flotation element employed in my composite aircraft; said propeller having rupturable means, indicated at 109 for its shaft, in order that the propeller may be disengaged before said craft submerges.

In the heavier-than-air unit of the composite aircraft the tail portion of its fuselage $2^t$ is seen to have an explosive coupling $2^c$, an elevator $3^a$, and vertical rudder $3^r$ with control wires $3^c$ and its propellers are indicated by the reference character $68^p$. A marine rudder $81^r$ is provided for the flotation member, and the lighter-than-air member has an elevator $1^a$, with control wire $1^c$; and a vertical rudder $1^r$.

Variations may be resorted to within the spirit and scope of my said invention and parts thereof used without other.

I claim:

1. In a composite aircraft comprising the union of a lighter-than-air unit and a heavier-than-air unit, means rupturable by explosive means for the separation of these units one from another.

2. In a composite craft comprising the union of a lighter-than-air unit and a heavier-than-air unit, the latter provided with means for operation on land, means rupturable by explosive means for the separation of these units one from another.

3. In a composite craft including the union of a lighter-than-air unit and a flotation unit, the latter provided with means for operation on land, means rupturable by explosive means for the separation of said units one from another in operation and means for controlling said explosive means.

4. An aircraft comprising a lighter-than-air unit and a heavier-than-air unit, means for separably uniting these units, and expansive means for rendering the uniting means ineffective, thereby releasing the units.

5. A craft comprising a lighter-than-air unit, a heavier-than-air unit, and a marine unit, respective means for separably uniting these units one to another, and expansive means for rendering the uniting means ineffective, thereby releasing the units.

6. An aircraft comprising a lighter-than-air unit and a number of heavier-than-air units, respective means for separably uniting the heavier-than-air units with the lighter-than-air unit, and expansive means for rendering the uniting means selectively ineffective, thereby releasing a heavier-than-air unit.

7. A craft comprising a lighter-than-air unit, a heavier-than-air unit and a marine unit, respective means for separably uniting these units one to another, and expansive means for selectively rendering the uniting means ineffective, thereby releasing the units.

8. A craft comprising a lighter-than-air unit, a heavier-than-air unit, and a marine unit, the latter having means for operation on land, respective means for separably uniting these units one to another, and expansive means for selectively rendering the uniting means ineffective, thereby releasing the units.

9. In a composite craft including the union of a lighter-than-air unit, a heavier-than-air unit, and a flotation unit, the latter provided with means for operation on land, means rupturable by explosive means for the separation of said units one from another while in operation.

10. The combination with a dirigible of a depressed channel in its upper surface, said channel having a laterally flared entrance for the guidance of said airplane, and the walls of said channel serving to containingly flank the landing gear and body portion of said airplane.

11. The combination with a dirigible of a longitudinal, depressed channel in its upper surface, for the containment of an airplane landing gear and body portion, whereby the wings only of said airplane will lie in a plane above said channel.

12. The combination with a dirigible of a longitudinal, depressed channel in its upper surface, for the containment of an airplane landing gear and body portion, wherein the end openings to said channel respectively have oppositely inclined ways.

13. The combination with a dirigible of a longitudinal, depressed channel in its upper surface, for the containment of an airplane landing gear and body portion, a vertically movable base member for said channel, and means for elevating said member to thereby raise the airplane thereon for taking off purposes.

14. A dirigible having a landing channel for an airplane, said channel having a flared entrance for receiving an airplane from different angles.

15. A dirigible having a landing channel for an airplane and including housing means for the airplane and means for guiding the airplane to said housing means.

16. The combination with a dirigible of a longitudinal, depressed channel in its upper surface, a vertically movable member for said channel, guide means therefor, means for raising and lowering said member whereby it may serve either as a base or upper closure for said channel, and means of communication with said channel vertically through said dirigible.

17. The combination, with a dirigible, of an upper, walled enclosure therefor, a fixed base for said enclosure, a movable cover member on said base, a cabin attached to the lower surface of said dirigible, a vertical communicating well, through said dirigible, and elevating means located in said cabin to provide access between said cabin and enclosure, said elevating means, when extended, serving to raise said cover member to an upper closure position for said walled enclosure.

18. In combination, a dirigible having a cabin attached to its lower surface, a heavier-than-air flying machine in rupturable engagement therewith beneath said cabin, a well extending into said cabin from its under surface, and means of communication extending from said heavier-than-air flying machine into said cabin by way of said well.

19. In a composite craft including a dirigible, a flotation member, rupturable means of engagement therebetween, a supporting aerofoil located intermediate said dirigible and flotation member, and rupturable engaging means between said aerofoil and flotation member, the provision of an opening through said aerofoil, and means of communication, through said opening, between said flotation member and dirigible.

20. The combination with a craft, of a housing herein, a turret extensibly contained in said housing, and a cylinder extensible from said housing to increase the vertical projection of said turret.

21. The combination with a craft, of a housing therein, a turret extensibly contained in said housing, a cylinder extensible in said housing to increase the vertical projection of said turret, and means for coordinating the movement of said cylinder with the movement of said turret.

22. A dirigible composed of longitudinal sections whose adjacent ends are provided with conoidal interfitting means.

23. A dirigible composed of longitudinal sections whose adjacent ends are provided with rupturable interfitting means.

24. A dirigible composed of longitudinal sections, adjacent sections having respectively interfitting conoidal male and female opposed ends.

25. A dirigible composed of longitudinal sections, adjacent sections having respectively interfitting conoidal male and female opposed ends, and said ends having engagings means to prevent relative rotation thereof.

26. A dirigible composed of longitudinal sections wherein an intermediate section has projecting conoidal ends, adjacent sections respectively with depressed conoidal ends for engagement with said projecting ends, and rupturable means for connecting said sections, whereby said intermediate section may be operable as an independent unit.

27. A dirigible composed of longitudinal sections wherein adjacent sections have respectively opposed interfitting projecting and depressed ends.

28. A dirigible composed of longitudinal sections in ruptural engagement, and forcible means for automatically separating adjacent disengaged sections.

29. The combination, with a dirigible, of a fuel tank recessed longitudinally within the under surface thereof.

30. The combination, with a dirigible, of a compartmented fuel tank rescessed longitudinally within the under surface thereof.

31. The combination, with a dirigible, of a fuel tank recessed longitudinally within the under surface thereof, a power plant supported by said dirigible, and communicating means from said reservoir to said power plant.

32. In combination, a dirigible, a fuel supply carried thereby, a heavier-than-air flying machine in rupturable engagement with said dirigible and having its own power plant, and a fuel pipe to convey fuel by gravity from said supply to said power plant.

33. In combination, a dirigible, a fuel supply carried thereby, a heavier-than-air flying machine in rupturable, pendent engagement with said dirigible and having its own power plant, a fuel pipe composed of upper and lower separable parts to convey fuel by gravity from said supply to said power plant, and a self seating valve to close the upper pipe part upon the disengagement of said dirigible and heavier-than-air flying machine.

34. In a composite craft including a dirigible, having a fuel supply, a flotation member, having a power plant, rupturable means of engagement therebetween, a supporting aerofoil located intermediate said dirigible and flotation member, and rupturable engaging means between said aerofoil and flotation member, the provision of an opening through said aerofoil, and a fuel feed pipe extending through said opening to convey fuel from said fuel supply to said power plant.

35. In a power craft having air screw and water screw power plants, in combination, balancing and adjusting means therefor, and controlling means for said adjusting means, whereby said power plants may be adjusted both separately and together.

36. In a power craft having air screw and water screw power plants, in combination, balancing and adjusting means therefor, and controlling means for said adjusting means, whereby said plants may be adjusted both separately and together, and cushioning means for said adjusting and balancing means.

37. In a power craft having air screw and water screw power plants, in combination, balancing and adjusting means therefor, controlling means for said adjusting means, whereby said power plants may be adjusted both separately and together, and means for locking said adjustment means.

38. In a flotation member, in combination, a rearwardly located power plant therein, having a shaft and a propeller, means for tilting said power plant vertically to vary the lie of its propeller axis between a horizontal and a forwardly upward plane, the provision of a slot in said flotation member to permit said variation, and means for preventing the inflow of water through said slot.

39. In a power craft having a flotation member and a supporting aerofoil member in rupturable engagement therewith, for flight, in combination, an air screw power plant located forwardly in said flotation member, and a water screw power plant located rearwardly therein, said power plants being each adjustable vertically to vary the axial lies of their screws, for operation between a horizontal plane and forwardly upward inclines, and control means to effect said adjustment.

40. In a power craft having a flotation member and a supporting aerofoil member in rupturable engagement therewith, for flight, in combination, and air screw power plant located forwardly in said flotation member, and a water screw power plant located rearwardly therein, said power plants being adjustable vertically to vary the axial lies of their screws between a horizontal plane and forwardly upward inclines, common control means to effect said adjustment, and release means for said air screw power plant relatively to said adjustment means, for the selective adjustment of one of said power plants.

41. In a power craft having a forwardly located air screw power plant and a rearwardly located water plant, said power plants each tiltable vertically to vary the angle of their screw axes, a rearward support for each power plant, connecting drive means whereby said supports are accorded vertical movement together, control means for said drive means, and release means for said air screw power plant support, whereby said water screw power plant may be adjusted independently of said air screw power plant.

42. In a flotation member, in combination, a rearwardly located power plant therein, having a shaft and a propeller, means for tilting said power plant vertically to vary the lie of its propeller axis between a horizontal and a forwardly upward plane, the provision of a vertical slot in the stern of said flotation member to permit said variation, an outer cover for said slot, and a spring located between the propeller hub and said cover to hold the latter in slot closing position.

43. In a water craft for navigation upon and below the surface, the combination of an air screw propeller for use on the surface and means rupturable by explosive means for disengaging said propeller prior to submersion of said craft.

44. In a dirigible having an upper channel, and vertical means of communication therewith from its lower portion, the combination of turrets extensible from said dirigible, and means of communication between said turrets and channel when said turrets are extended.

45. The combination, with an aircraft, of means included interiorly within said aircraft for receiving, housing and uniting flying elements and flying units therewith, under operation.

46. A craft unit in structurally homogeneous union with aircraft which are rupturably separable therefrom by explosive means, said unit being provided with complete operating means for both water and land travel.

47. A flotation unit in structurally homogeneous union with aircraft, the union being rupturably separable by explosive means, said unit possessing means for its propulsion, guidance and stabilizing in water with the aircraft elements ruptured therefrom.

48. A craft unit in structurally homogeneous union with aircraft, the union being rupturably separable by explosive means, said unit possessing means for its propulsion, guidance and stabilizing on land and water with its aircraft elements ruptured therefrom.

49. A craft in structurally homogeneous union with aircraft, the union being rupturably separable by explosive means, said craft possessing means for its propulsion, guidance and stabilizing on land and water with its aircraft elements ruptured therefrom.

50. A craft in structurally homogeneous union with aircraft, the union being rupturably separable by explosive means, said craft possessing means for its propulsion, guidance and stabilizing in its operation from water to land and from land to water.

51. The combination with an aircraft, of means included interiorly within said aircraft for rigidly uniting and housing flying elements and flying units therewith and means for separating said elements and units, under operation.

52. A dirigible having a guide channel in its upper surface for the alighting thereon and taking off therefrom of an airplane, and means rupturable by explosive means for the engagement of an airplane with the channel.

53. A dirigible with interior housing means for airplanes, said housing means having receiving means whereby an airplane may enter the housing means.

54. A dirigible with housing means for airplanes, said interior housing means having departure means whereby an airplane may leave the housing means.

55. A dirigible with interior housing means for airplanes, said housing means having receiving and departure means whereby an airplane may enter and leave the housing means.

56. In a composite craft including the union of a lighter-than-air unit, a heavier-than-air unit and a flotation unit, the latter with means for operation on land, means rupturable by explosive means for the separation of said units one from another in operation, and means for controlling said explosive means from a distance.

57. The combination, with a power craft, of propelling means comprising respective power plants for an air screw and a water screw in adjustable operative relation to one another.

58. The combination with a power craft of propelling means comprising respective power plants for an air screw and a water screw, in adjustable, operative relation to one another, and respective housing means for each power plant.

59. The combination with a craft, of a housing therein, a stream-lined, revolving and disappearing turret telescopingly contained in said housing, cylinders in telescopic relation with said turret to increase the vertical projection thereof, and means for elevating, lowering and revolving said turret.

60. The combination with a craft, of a housing therein, a stream-lined, revolving and disappearing turret telescopingly contained in said housing, cylinders in telescopic relation with said turret to increase the vertical projection thereof, and means for co-ordinating the movement of said telescopic turret cylinders.

61. A dirigible composed of longitudinal sections whose adjacent ends are provided with rigid, separable, interfitting and locking means.

62. A dirigible composed of longitudinal sections in endwise engagement, and means rupturable by explosive means for forcibly disengaging said sections.

63. A dirigible composed of longitudinal sections, adjacent sections having respectively interfitting male and female locking ends, and said ends having engaging and locking means to prevent relative rotation thereof under operation.

64. A dirigible composed of longitudinal stream-lined sections wherein an intermediate section has projecting stream-lined locking ends, adjacent sections respectively with re-entrant stream-lined locking ends for engagement with said projecting ends, and rigid and separable means for connecting said sections, whereby said intermediate section may be separable as an independent unit.

65. A dirigible composed of longitudinal sections wherein adjacent sections have respectively opposed interfitting stream-lined projecting and re-entrant locking ends.

66. A dirigible composed of longitudinal sections in rigid and separable engagement, and mechanical power means for automatically separating adjacent disengaged sections.

67. A dirigible composed of longitudinal rigidly and separably united sections in endwise engagement, and means rupturable by explosive means for separating said sections under operation.

68. In combination, a dirigible, a fuel supply carried thereby, a heavier-than-air flying machine in rigid and separable engagement with said dirigible and having its own power plant, a fuel pipe composed of aligned upper and lower separable parts to convey fuel by gravity from said supply to said power plant, and a self seating valve to close the upper part upon the disengagement of said dirigible and heavier-than-air flying machine.

69. In a composite craft including a dirigible having a fuel supply, a flotation member, having a power plant, rigid and separable means of engagement therebetween, a supporting aerofoil located intermediate said dirigible and flotation member, rigid and separable engaging means between said aerofoil and flotation members, the provision of an opening through said aerofoil, and a fuel pipe extending through said opening to convey fuel from said fuel supply to said power plant.

70. In a power craft having air screw and water screw power plants, in combination, balancing and adjusting means therefor, controlling means for said adjusting means, whereby said plants may be adjusted both separately and together, and movement limiting means for said adjusting and balancing means.

71. In a power craft having air screw and water screw power plants, in combination, balancing and adjusting means therefor, controlling means for said adjusting means, whereby said power plants may be adjusted both separately and together, means for locking said adjustment means, and means for locking said balancing means.

72. In a flotation member, in combination, a rearwardly located power plant therein, having a shaft and a propeller, means for tilting said power plant vertically to vary the lie of its propeller axis between a horizontal and forwardly upward plane, the provision of a vertical opening in the stern of said flotation member to permit said variation, protecting means for said opening, and tensional means to hold said protecting means in operative position.

73. In a craft for navigation in the air and upon and below the surface of water, the combination of an air screw propeller for use in the air and on the surface of water, a marine propeller for use upon and under the surface of water, and expansion means for separating said aerial propeller prior to submersion of said craft.

74. A flotation power craft whose keel portion is composed of longitudinal sections in removably engaged relation to one another, one of said sections serving as a housing for a power plant.

75. An aircraft having a channel with a movable base member, and mechanical means for moving said member to and from said channel.

Signed at the borough of Manhattan, in the city, county, and State of New York, this 14th day of April, A. D. 1920.

HENRY E. KRAMMER.